Dec. 13, 1955     C. O. HULL     2,727,087
ARMORED OIL WELL CABLE
Filed April 18, 1952
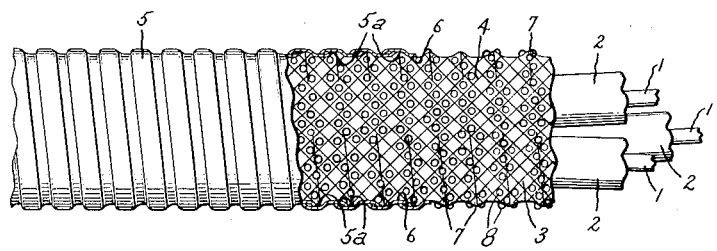
Inventor:
Clifford O. Hull,
by *[signature]*
His Attorney.

United States Patent Office 2,727,087
Patented Dec. 13, 1955

2,727,087

ARMORED OIL WELL CABLE

Clifford O. Hull, Stratford, Conn., assignor to General Electric Company, a corporation of New York Application April 18, 1952, Serial No. 282,973

3 Claims. (Cl. 174—109)

This invention relates to armored electric cable and in particular to an armored cable intended for those uses in which long lengths of cable are more or less vertically suspended in such a manner that they must support their own weights.

Armored cables of the class referred to find use in oil wells, mines and the like for conducting electric power and signal currents. In installations of this character, it is often necessary to suspend long lengths of cable in such a manner as to provide for vertical support only at intervals along the depth of the oil well or mine shaft. The suspension device usually grips the cable only about its outer covering, which customarily is steel outer armor. Such cables may have lengths of from 1000 to 5000 or more feet. Thus the suspended weight of the conductor inside the cable armor may be a ton or more, depending upon the number and size of the conductors. It will be evident therefore that there will be a persistent tendency for the insulated cable conductors to slip downwards within the armor. If such slippage does occur, great tension may be placed on the conductors or the apparatus to which they may be connected. Consequently, it is important that the conductors of such cable be firmly anchored to the outer armor so that a significant amount of relative axial displacement between them cannot occur.

Another requirement for oil well and mine cables is that they be quite flexible in order that they may easily be lowered into or removed from the oil well or mine, which operation may have to be performed many times on the same piece of cable.

The two above-mentioned requirements, namely (1) that the cable conductors be firmly anchored longitudinally to the outer covering to prevent axial displacement between the two when long lengths are vertically supported and (2) that the cable be quite flexible are difficult to provide in a single structure because any firm bonding between the outer armor and the insulated cable conductors to prevent relative slippage tends to result in a stiff and inflexible cable.

Many solutions have been offered to this problem of suspending long cables in an armored sheath. For example, it has been suggested that a rubber or neoprene sheath about conductors be interlocked into a woven armored sheath. In some of these interlocking structures, a soft rubber-like insulating sheath about the conductors has been firmly embedded into the interstices produced by tightly wrapping a protective armor about the soft sheath; while in others the rubber-like sheath about the conductors has been vulcanized to such an extent that the insulating sheath expands into the interstices formed in the protective armor. In each of these cases there was no complaint about the holding of the conductors relative to the outer armor to prevent slippage, but there was difficulty with the flexibility of the cable, since the rubber-like insulating sheath in being embedded in the interstices of the armor prevented relative slippage of the tape making up the armor and hence a relatively stiff cable was produced.

Accordingly, it is an object of this invention to provide an improved armored cable for vertical suspension wherein there is adequate interlocking between the armor and conductors to prevent relative axial movement.

It is a further object of this invention to provide an improved interlocked cable structure for vertical suspension wherein the percentage of sheath expansion during vulcanization need not be maintained within critical limits.

It is a still further object of this invention to provide an improved cable structure for vertical drops wherein the vulcanized sheath material will not interfere with the relative slippage of cable armor tape during the bending of the cable.

Further objects and advantages of this invention will become apparent and the invention will be more clearly understood from the following description referring to the accompanying drawing and the features of novelty which characterize this invention will be pointed out with particularity in the claims annexed to and forming a part of this specification.

Briefly, this invention comprises the positioning of a sheath of neoprene or similar rubber-like material about insulated conductors with the sheath being wrapped with an open meshed glass yarn and this assembly then being installed in a wrapped armor coating. The vulcanization of the glass encased sheath within the armor permits only a partial extrusion of the sheath through the open mesh into the voids produced by the armor thereby to provide a relatively flexible cable.

Referring to the drawing, the single figure is a front elevation partially cut away to show the structure of my improved armored cable.

In the drawing, my invention has been illustrated with respect to a three-conductor stranded insulated cable, but it will be understood by those skilled in the art that my invention may be applied to cable having any number of conductors as may be required.

In accordance with my invention, the individual conductors 1 may, as illustrated, be initially separately coated with any suitable insulating material 2. Subsequently, the three insulated conductors are twisted together and in one embodiment are covered overall by one extruded sheath or jacket 3 of vulcanizable thermosetting elastomeric insulating material.

The sheath 3 consists of any thermosetting elastomer or it may be a combination of thermosetting elastomers which are vulcanizable; that is which can be cured under heat. A suitable material must expand somewhat in volume during curing. As an example, I may use chloroprene in a mixture containing, say 40% chloroprene together with fillers, softeners, etc. Other examples of suitable material are Thiokol, Buna-S, Buna-N and rubber. Still other examples will occur to those skilled in the art.

After the smooth outer sheath 3 has been extruded over the individually insulated conductors 1, the jacket is wrapped with an open meshed glass tape 4.

The woven glass tape 4 shown in the illustrated embodiment should be applied with a slight lap. Such a tape is more particularly described in a copending application in the name of Eugene Crandall, Serial No. 140,470, filed January 25, 1950, and assigned to the same assignee as that of the present invention. Briefly, this glass tape is analogous to a wire screen and has a prefixed number of strands per inch. For example, there may be 10 or 20 strands per inch in either direction in the glass screening. These dimensions are not critical and do not reflect on the scope of this invention. However, a relatively open mesh weave should be used. In still other embodiments the glass may be applied as an open braid, or several spindles can be used simultaneously to wrap thread in one direction, and then in the reverse direction to form diamond shaped openings about the sheath.

After the tape 4 has been applied over the sheath and over the cable conductors, the uncured sheath is covered by a flexible armor, preferably a flexible interlocking steel tape 5 which is wound over the sheath 3 and glass 4 in light contact therewith as shown in the drawing. The armor tape 5 is wound or shaped or both so as to leave spaces between the inner surfaces of the armor tape and the glass wrapped sheath, in this case a spiral groove 5a. The inner surface of the applied armor thus presents a configuration having somewhat sinusoidal indentation spaced along its length.

After the application of the armor over the glass and tape the cable is then cured, under suitable conditions of temperature and pressure depending upon the type sheath material 3, in order to vulcanize and expand the latter. The cable with its armor may, for example, be placed within a suitable steam chamber or drum and subjected to hot steam under pressure for the required length of curing time.

The advantage of using an open mesh glass tape 4 is that it will not stretch while the jacket 3 is expanding under vulcanization. Accordingly, the sheath material will partially extrude through the open interstices of the glass mesh.

There is only a partial extrusion of the sheath material through the glass since the open mesh presents a sort of surface tension effect to the sheath 3 during vulcanization, that is, the sheath cannot expand at will to fill the spiral grooves 5a formed by the tape armor, instead the glass tape resists this expansion to the extent that there is only a partial filling of the spiral groove 5a. While this partial filling is sufficient to prevent relative axial movement of the sheath and conductors to the armor, yet there is not such a wedging and binding of the sheath material in the armor as to prevent satisfactory flexing of the armored cable.

The outer surfaces of the sheath 3 after extrusion will be formed permanently into ridges 7 conforming to the shape of the indentations or the spiral groove 5a in the flexible interlocking armor 4 as shown in the drawing. Thus the armor acts as a mold to shape the sheath surface to form the desired mechanical interlocks between them. It is to be noted, however, that the ridges 7 are not continuous helices to match spiral groove 5a, but rather are they pebbly or made up of a number of dots 8—a result of the extrusion through the woven glass.

While in the past, vulcanizations of sheath material have been made within an armored cable, definite care had to be taken in the degree of vulcanization to prevent the sheath material from expanding too much; e. g. to the extent that it would wedge into the armor tape or crack the armored sheath. It is to be noted that in my improved invention, with the glass tape of the open mesh type, it is not necessary to regulate the expansion of the sheath material within critical limits because the woven glass controls the degree of expansion. It is also to be noted that the woven glass has high strength preventing the stretching of the glass tape into the spiral groove 5a, which, if it did happen, might tend to bind the armored tape 4.

It has also previously been proposed to use an applied interlock armor as a jacket or mold for the vulcanization or curing of an underlying uncured sheath material. Such proposal, however, was for the purpose of obtaining a moisture-proof bond between the sheath material and the armor and require that the armor be tightly applied to the uncured sheath material. In contradistinction to that prior art proposal, it will be observed that as described above, I apply the outer armor to the uncured sheath quite loosely and with at most a very light contact pressure. It is only with this precaution that it is possible to obtain simultaneously the required flexibility together with mechanical interlocks in the axial direction between the armor and the sheath.

The manufacturing cost of such an armored cable as described is relatively low. The armor forms a jacket for the sheath during vulcanization, while at the same time serving as a mold to produce the desired surface configuration on the outside of the sheath to provide the desired mechanical interlocks between the sheath and the armor. Furthermore, the flexibility normally associated with interlocking tape armor is fully retained.

It has been found that with the manufacture of cable as herein described, the glass tape prevents the complete interlocking of the armor and the sheath to the extent that it would prevent flexing and yet the sheath and glass is interlocked with the armor to a degree that it will prevent relative axial movement, as is illustrated by the fact that it is necessary to unscrew the inner conductors and sheath combination from the armor in order to remove one from the other.

Modifications of this invention will occur to those skilled in the art and it is desired to be understood, therefore, that this invention is not to be limited to the particular embodiment disclosed but rather is it intended to cover all modifications which are within the true spirit and scope of this invention.

What I claim as new and desire to secure by Letters Patent in the United States is:

1. A flexible armored electrical cable suitable for vertical suspension comprising at least one conductor, a sheath of vulcanized thermosetting elastomer surrounding said conductor, an open braided glass yarn covering surrounding said sheath, a flexible interlocking metallic armored tape surrounding both said sheath and said braided covering and means mechanically interlocking said vulcanized glass braided sheath and said armor against relative axial displacement, said means comprising spaced apart portions of said sheath extending between some of said yarns of said open braid into a spiral groove formed on the inner-surface of said armor so that a dotted helix of sheath material is formed on the outer-surface of said sheath.

2. A flexible armored electrical cable suitable for vertical suspension comprising at least one conductor, a sheath of vulcanized thermosetting elastomer surrounding said conductor, an open-meshed glass tape surrounding said sheath, a flexible interlocking S-shaped metal armored tape surrounding said sheath and said glass tape so that there is a spiral concavity formed between the interlocking portions on the inner surface of the resulting armor, and means mechanically interlocking said vulcanized glass tape sheath in said armor against relative axial displacement, said means comprising portions of said sheath partially extending through said glass tape into a portion of said spiral concavity so as to form a dotted helix of sheath material on the outer surface of said sheath.

3. In the method of forming a flexible interlocking armored electrical cable suitable for vertical suspension comprising the steps of surrounding one or more insulated conductors with a single sheath of unvulcanized thermosetting elastomer, of tightly covering the sheath with an open-meshed glass yarn, and of applying a flexible interlocking armor over said glass-covered sheath, then of curing the cable by the application of heat to vulcanize and expand the sheath, the sheath material partially extruding through some of the interstices of the glass yarn and into the spiral groove formed on the inner surface of the armor so that a dotted helix of sheath material is formed on the outer surface of the sheath.

References Cited in the file of this patent

UNITED STATES PATENTS

| 2,474,977 | Hart | July 5, 1949 |
| 2,522,169 | Frei | Sept. 12, 1950 |

FOREIGN PATENTS

| 40,453 | Holland | Apr. 15, 1937 |
| 558,033 | Great Britain | Dec. 16, 1943 |